(12) United States Patent
Hinrich

(10) Patent No.: US 10,381,896 B2
(45) Date of Patent: Aug. 13, 2019

(54) COOLING DEVICE FOR A VEHICLE

(71) Applicant: Dr. Ing. h.c. F. Porsche Aktiengesellschaft, Stuttgart (DE)

(72) Inventor: Holger Hinrich, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 132 days.

(21) Appl. No.: 15/814,639

(22) Filed: Nov. 16, 2017

(65) Prior Publication Data

US 2018/0138776 A1    May 17, 2018

(30) Foreign Application Priority Data

Nov. 17, 2016 (DE) .......................... 10 2016 122 129

(51) Int. Cl.
*H02K 5/20* (2006.01)
*H02K 9/19* (2006.01)

(52) U.S. Cl.
CPC ................ *H02K 5/20* (2013.01); *H02K 9/19* (2013.01)

(58) Field of Classification Search
CPC .................................. H02K 5/20; H02K 9/19
USPC ...................................................... 310/59, 54
See application file for complete search history.

(56) References Cited

U.S. PATENT DOCUMENTS

| | | | | |
|---|---|---|---|---|
| 3,629,628 A | * | 12/1971 | Rank .................. | H02K 9/19 310/54 |
| 2008/0197718 A1 | * | 8/2008 | Wohner ............... | H02K 1/02 310/11 |
| 2012/0169158 A1 | * | 7/2012 | Buttner ............... | H02K 9/20 310/54 |
| 2015/0207378 A1 | * | 7/2015 | Buttner ............... | H02K 5/20 310/54 |

FOREIGN PATENT DOCUMENTS

| DE | 102008035896 A1 | 2/2010 |
|---|---|---|
| DE | 102010025650 A1 | 1/2011 |
| DE | 102012219943 A1 | 4/2014 |

OTHER PUBLICATIONS

German Search Report for German Application No. 10 2016 122 129.5, with partial English translation, dated Jul. 13, 2017—7 Pages.

* cited by examiner

*Primary Examiner* — Alex W Mok
(74) *Attorney, Agent, or Firm* — RatnerPrestia

(57) ABSTRACT

A cooling device for a vehicle, having an inner housing with an inner cooling wall, and an outer housing which surrounds the inner housing, is spaced apart via a cooling gap and has an outer cooling wall. A cooling volume for passage of a cooling fluid is formed between the inner cooling wall and the outer cooling wall. The inner cooling wall and/or the outer cooling wall furthermore have channel walls for dividing the cooling volume and guiding the cooling fluid. At least one clamping device is arranged around the cir- (Continued)

cumference of a circumferential wall of the outer housing for introducing a deformation force into the outer housing in order to reduce the cooling gap by deforming the outer housing.

11 Claims, 5 Drawing Sheets

COOLING DEVICE FOR A VEHICLE

CROSS-REFERENCE TO RELATED APPLICATIONS

This application claims priority to German Patent Application No. DE 10 2016 122 129.5, filed Nov. 17, 2016, the content of such application being incorporated by reference herein in its entirety.

FIELD OF THE INVENTION

The present invention relates to a cooling device for a vehicle, and to a method for installing such a cooling device.

BACKGROUND OF THE INVENTION

It is known that cooling devices have to be used in vehicles in order to cool components of the vehicle. These are in particular drive components of internal combustion engines and/or of electric motors or electric components of the vehicle. Known cooling devices are customarily provided with cooling volume, through which a cooling fluid passes. During passage through the cooling volume, the cooling fluid can absorb heat and by flowing on further can remove the heat. In the case of the known solutions, the cooling devices are customarily constructed from two shells, namely with an inner housing and an outer housing. A cooling gap which provides the cooling volume remains between the inner housing and the outer housing.

A disadvantage of the known solutions is that the cooling gap between the inner housing and the outer housing has to provide a necessary oversize to allow for installation. Cooling walls are thus customarily arranged in the cooling volume in order to be able to separate the cooling volume and provide guidance during the passage of the cooling fluid. In order, however, to ensure a necessary oversize of the cooling gap, a free space remains between the inner housing and the outer housing to the effect that unwanted cooling fluid can also flow beyond said channel walls. This is necessary since a corresponding installation gap between the associated cooling wall of the outer housing and/or of the inner housing and the respective channel wall is necessary to allow for installation. However, said unwanted flow will result in a reduction in the cooling capacity, which can be eliminated only by increasing the size of the entire cooling device. In addition to increased costs, this leads to an increased weight and more space being required within a vehicle.

SUMMARY OF THE INVENTION

The cooling device described herein at least partially eliminates the problem stated above. In particular, the cooling device improves or at least maintains the cooling capacity of a cooling device in a cost-effective and simple manner while allowing for easy installation.

Features and details which are described in conjunction with the cooling device according to aspects of the invention also apply here in conjunction with the method described herein according to aspects of the invention, and vice versa in each case, and therefore, with regard to the disclosure, reference is always, and can always be, made reciprocally to the individual aspects of the invention.

A cooling device according to aspects of the invention for a vehicle has an inner housing with an inner cooling wall. Furthermore, an outer housing with an outer cooling wall which surrounds the inner housing in a manner spaced apart via a cooling gap is provided. A cooling volume for passage of a cooling fluid is formed between the outer cooling wall and the inner cooling wall. Furthermore, the inner cooling wall and/or the outer cooling wall have channel walls for dividing the cooling volume and guiding the cooling fluid. A cooling device according to aspects of the invention is distinguished in that at least one clamping device is arranged around the circumference of a circumferential wall of the outer housing for introducing a deformation force into the outer housing in order to reduce the cooling gap by deforming the outer housing.

A cooling device according to aspects of the invention is therefore based on the known multi-part solutions of the cooling devices. An inner housing and an outer housing are also provided here, wherein the outer housing is pushed onto the inner housing, and therefore the outer housing surrounds the inner housing in the installed state. The outer housing and the inner housing here preferably have complementary geometries and can be formed, for example, by cylindrical portions. However, other geometries are in principle also conceivable for the inner housing and the outer housing. A cooling gap which also provides the cooling device therefore extends between the inner housing and the outer housing. The cooling gap is preferably further subdivided into channel portions by means of individual channel walls which can be configured both as separate components and as portions of the inner cooling wall and/or of the outer cooling wall. However, to allow for installation of the cooling device, the cooling gap is larger than the corresponding radial extent of the channel walls. A residual gap, which can also be referred to as the installation gap, therefore remains between the end side in the radial direction of the respective channel wall and the opposite inner cooling wall or the opposite outer cooling wall. In a known manner of installation, the outer housing can therefore be pushed onto the inner housing without contacting, the production of friction surfaces or even the removal of chips having an effect on the subsequent functionality of the cooling device.

In order, however, to reduce the known disadvantages of unwanted flows via said installation gap which remains as a residual gap of the cooling gap after installation, the clamping device or at least one clamping device is now provided according to aspects of the invention. The clamping device is arranged here around the circumference of a circumferential wall of the outer housing. The circumferential wall can also be understood here as meaning the outer skin or outer wall of the outer housing. The clamping device here can be part of the outer housing or else also a separate device. The clamping device therefore preferably extends completely around the entire circumference of the outer housing, and therefore the deformation force according to aspects of the invention can be subsequently introduced into the outer housing. As soon as the deformation force is therefore introduced into the outer housing with the aid of the clamping device, the outer housing is deformed in accordance with the deformation force introduced until a new equilibrium of forces has arisen between the elastic restoring force of the outer housing, on the one hand, and the deformation force applied by the clamping device, on the other hand. Said deformation can be configured both elastically and also at least partially plastically. However, the purely elastic deformation of the outer housing that is also explained later on is preferred. By means of this deformation of the outer housing, the cooling gap is then reduced further in the radial direction, and therefore the installation gap which is still present and is necessary for the installation is likewise reduced at the same time or even minimized completely to zero.

This therefore means that the bypass flows or unwanted flows beyond the cooling walls is can be reduced or even substantially entirely eliminated since the corresponding inner geometry of the cooling volume can be changed by the deformation of the outer housing.

In the case of a cooling device according to aspects of the invention, use can therefore be made of a known installation method, wherein an additional and final step is available with the clamping device in order to avoid the installation gap and therefore the previous disadvantages of the known cooling device.

In the case of known cooling devices, the cooling efficiency or the cooling effectiveness can now be significantly increased with the aid of the clamping device without a further change in the geometrical configuration concepts. In particular, unwanted flows are avoided, and therefore the thermodynamic configuration becomes significantly simpler, and, in reality, even substantially ideal cooling flows of a cooling fluid are provided by henceforth ideal cooling volumes which are separated by means of the channel walls.

It can be of advantage if, in the case of a cooling device according to aspects of the invention, the clamping device has at least one clamping means for in particular reversibly producing the deformation force. Such a clamping means can have, for example, a mechanical clamping means in the form of a strap system, a screw or a lever. In particular, the clamping means are provided with a corresponding amplification of force, and therefore the deformation force can be introduced easily and favorably in terms of force by the user with the aid of a lever or a deflecting device, for example. Of course, the clamping means, in particular for the reverse technique, can also permit a release, and therefore, in particular in combination with a purely elastic deformation of the outer housing, removal is simply, cost-effectively and rapidly possible. It is also possible in this way to carry out maintenance work on the cooling device since, after removal in the known manner, re-installation with the aid of the clamping device can be carried out as for the first installation.

It is likewise of advantage if, in the case of a cooling device according to aspects of the invention, the clamping device is designed for introducing the deformation force into the outer housing in the radial direction and/or in the circumferential direction of the outer housing. In other words, the deformation force is preferably introduced into the outer housing in one or a maximum of two directions. The introduction in the radial direction makes it possible to have a direct influence on the deformation force, in particular in individual portions of the outer housing. The introduction of the deformation force in the circumferential direction makes it possible in particular to even out or uniformly distribute the deformation of the outer housing in the circumferential direction. Furthermore, an orientation of the deformation force in the radial direction or in the circumferential direction makes is possible for the clamping device to be able to be designed particularly simply and cost-effectively.

It can likewise be of advantage if, in the case of a cooling device according to aspects of the invention, the clamping device extends over a clamping axial portion in the outer housing that takes up between 20% and 90% of the axial extent of the circumferential wall. In other words, this is not only a simple clamping strap, but rather a clamping device which also covers a certain surface of the circumferential wall of the outer housing. The clamping axial portion preferably extends over the entire or substantially entire outer housing, and therefore one or more clamping means or one or more clamping devices can act upon said clamping axial portion with the corresponding deformation force. This leads to the deformation preferably also being able to be evened out in the axial direction.

It can be a further advantage if, in the case of a cooling device according to aspects of the invention, at least two clamping devices, in particular identical or substantially identical clamping devices, extend over a clamping axial portion of the outer housing that takes up between 20% and 90% of the axial extent of the circumferential wall. When two or more clamping devices are used, an easier distribution and improved installation capability are provided. In particular, clamping devices which are simple and cost-effective, since they are of small design, can be used, and at the same time a substantially large clamping axial portion can be acted upon with the desired deformation force. Furthermore, the use of two or more clamping devices also permits deformation forces of differing strength to be able to be introduced into the clamping axial portion of the outer housing. Of course, the clamping axial portion can be split into individual partial axial portions which can subdivided by non-clamping axial portions.

It is furthermore likewise of advantage if, in the case of a cooling device according to aspects of the invention, the clamping device has at least one of the following materials: metal, fiber composite material, and fiber material.

The above enumeration is not a definitive list. In particular, combinations of the materials described can also be used. The materials are used here in particular for a corresponding sleeve of the clamping device, which is preferably used in direct connection with the circumferential wall of the outer housing. However, the materials are also usable for the clamping means already explained, for example corresponding lever devices or screw devices.

Furthermore, it can be of advantage if, in the case of a cooling device according to aspects of the invention, the outer housing is designed, at least in an axial clamping portion of the outer housing, for an elastic or substantially elastic deformation under the action of the deformation force of the clamping device. The elastic or substantially elastic deformation makes it possible, in particular in a defined manner, to predict the deformation and therefore also the arising ratio of forces. In particular, reversible usability is also provided here, and therefore, after removal of the clamping device, the outer housing is elastically reshaped. The again increasing cooling gap can then provide an installation gap which makes it possible to pull off the outer housing from the inner housing simply and rapidly. For re-installation, the clamping device can be placed on, as for the first installation, in order to be able to form the elastic deformation in the clamping axial portion. Of course, deformation of the individual cooling walls is also possible, and therefore said deformation in combination with the elastic deformation of the outer housing can provide an additional sealing action within the cooling volume.

A further advantage can be obtained if, in the case of a cooling device according to aspects of the invention, the clamping device has an opening portion which, in an opening position of the clamping device, has an opening which is greater than or equal to the diameter of the circumferential wall of the outer housing. In addition to a solution in which the clamping device is pushed axially over the outer housing, this embodiment, with an opening portion, can also be conceivable for pushing on or pulling over the clamping device in the radial direction, i.e. In a manner taking place transversely with respect to the circumferential direction. By means of this lateral engagement, the flexibility for the installation of a cooling device according to aspects of the invention is accordingly significantly increased.

The present invention likewise relates to a method for installing a cooling device according to aspects of the invention, having the following steps:
1. pushing the outer housing onto the inner housing with the cooling volume being formed,
2. arranging the at least one clamping device around the circumferential wall of the outer housing,
3. Introducing the deformation force by means of the clamping device into the outer housing in order to deform the outer housing for reducing the cooling gap.

By means of the use of a cooling device according to aspects of the invention, the same advantages are obtained in the production and/or installation of said cooling device as have been explained in detail with respect to the cooling device according to aspects of the invention.

A method according to aspects of the invention can be developed to the effect that when the deformation force is introduced, at least one deformation parameter of the clamping device and/or of the outer housing is measured and/or checked. A deformation parameter should be understood here as meaning in particular the deformation force which is introduced and/or the deformation which is carried out with respect to the change in the geometry. A differentiation should be made here in that either a measurement or checking of the deformation parameter is conceivable. During a measurement of the deformation parameter, either direct or indirect measurement is possible within the scope of the present invention. For checking the deformation parameter, it suffices to specify a defined end state of the deformation parameter, the reaching of which is monitored during the check. It can therefore be ensured that undesirably great deformations and therefore damage are avoided. At the same time, a predefined deformation and therefore also a predefined geometry as final deformation for the cooling volume are possible.

BRIEF DESCRIPTION OF THE DRAWINGS

Further advantages, features and details of the invention emerge from the description below in which exemplary embodiments of the invention are described in detail with reference to the drawings. The features mentioned in the claims and in the description may be essential to the invention in each case individually by themselves or in any combination. In the drawings, schematically:

DETAILED DESCRIPTION OF THE INVENTION

Figure 1:
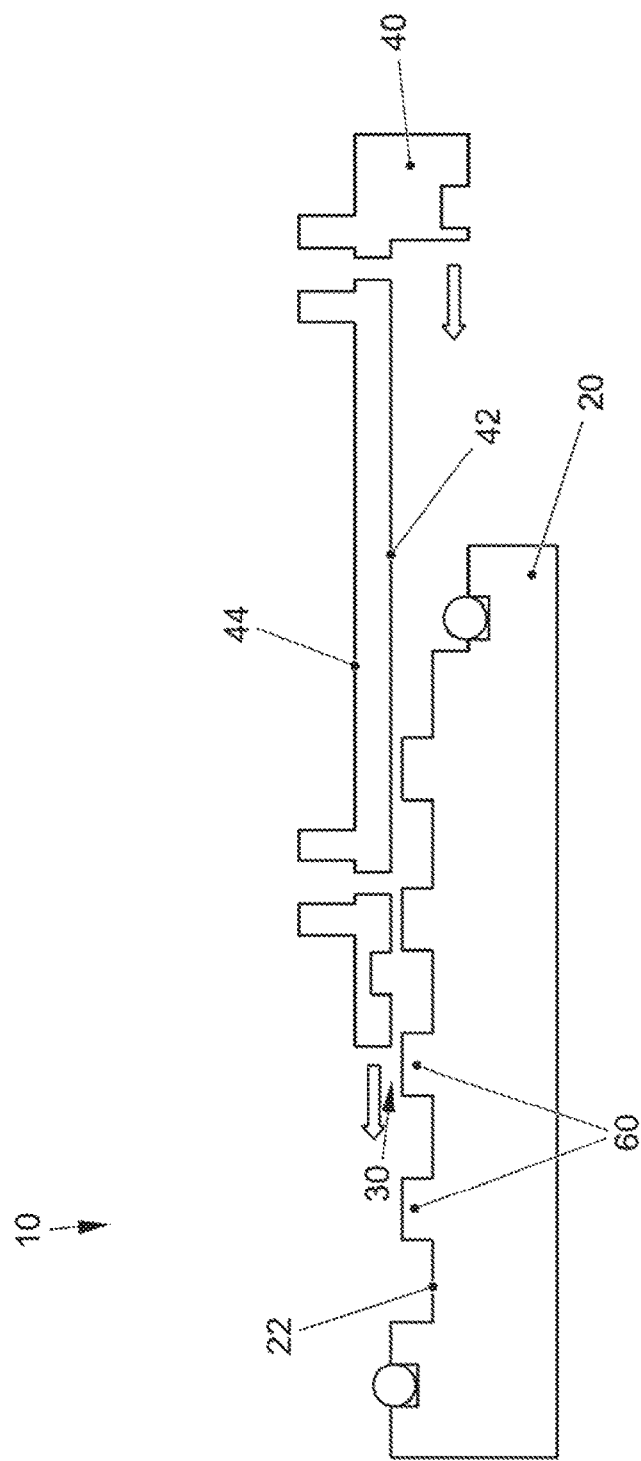
FIG. 1 shows a cooling device according to aspects of the invention during the installation method.

A method according to aspects of the invention with which a cooling device 10 according to aspects of the invention can be provided is explained below with reference to FIGS. 1 to 4. FIG. 1 shows an initial state, in which an outer housing 40, preferably with cylindrical cross-sectional geometry, is pushed onto a correspondingly likewise cylindrical cross-sectional geometry of an inner housing 20. FIGS. 1 to 4 in each case only illustrate the upper portion of the outer housing 40 and of the inner housing 20, wherein the correspondingly cylindrical design is depicted by the indicated center line.

FIG. 1 now shows how the outer housing 40 is pushed over the inner housing 20. This is possible since there is a cooling gap 30 between the inner cooling wall 22 and the outer cooling wall 42, said cooling gap being greater than the corresponding radial extent of the cooling walls 60. An installation gap which is accordingly smaller than the cooling gap 30 therefore remains between the radial end walls of the cooling walls 60 in order to push the outer housing 40 onto the inner housing 20 in a manner as free as possible from contact. As soon as the pushing of the outer housing 40 onto the inner housing 20 is ended, a situation is found again, as shown in FIG. 2.

Figure 2:
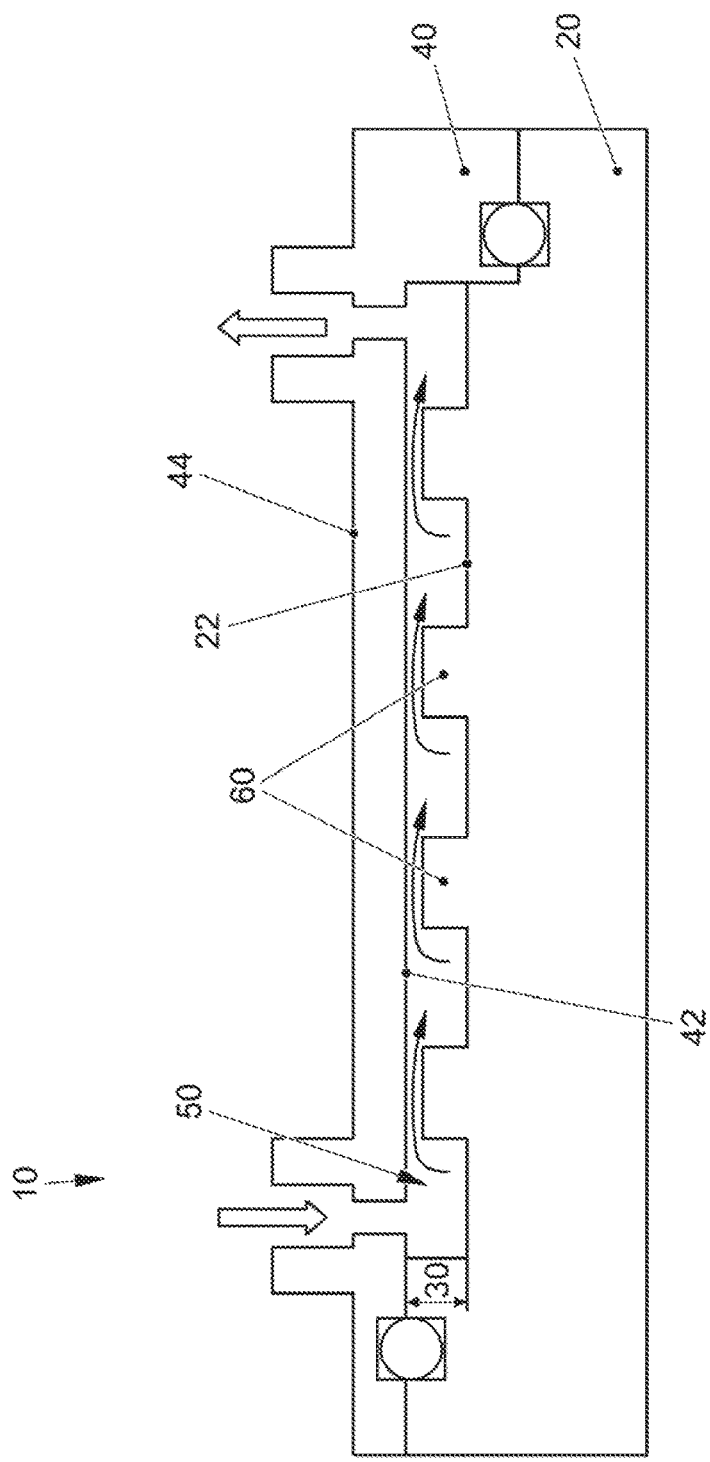
FIG. 2 shows the embodiment of FIG. 1 during the installation method.

FIG. 2 depicts a problem that could result using cooling device 10. Should the installation method stop here, it can readily be seen here, with reference to the arrows going beyond the individual cooling walls 60, how cooling fluid can be at least partially misdirected within the cooling volume 50. While the cooling walls 60 are actually conceived to provide guidance of the cooling fluid in the circumferential direction in the cooling volume 50, it may happen, however, that some of the cooling fluid is misdirected in the axial direction between the outer cooling wall 42 and the respective radial end side of the cooling wall 60 and a bypass can therefore be provided.

Figure 3:
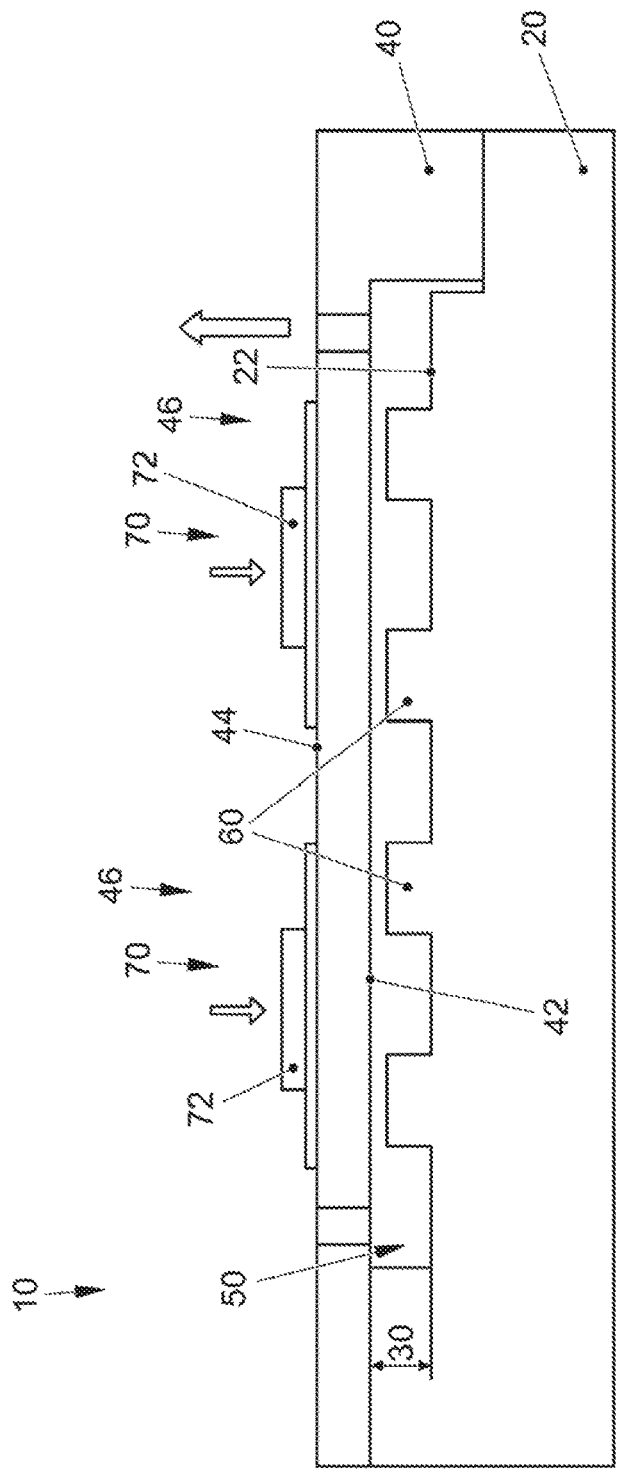
FIG. 3 shows the embodiment of FIGS. 1 and 2 after application of the clamping device.
Figure 4:
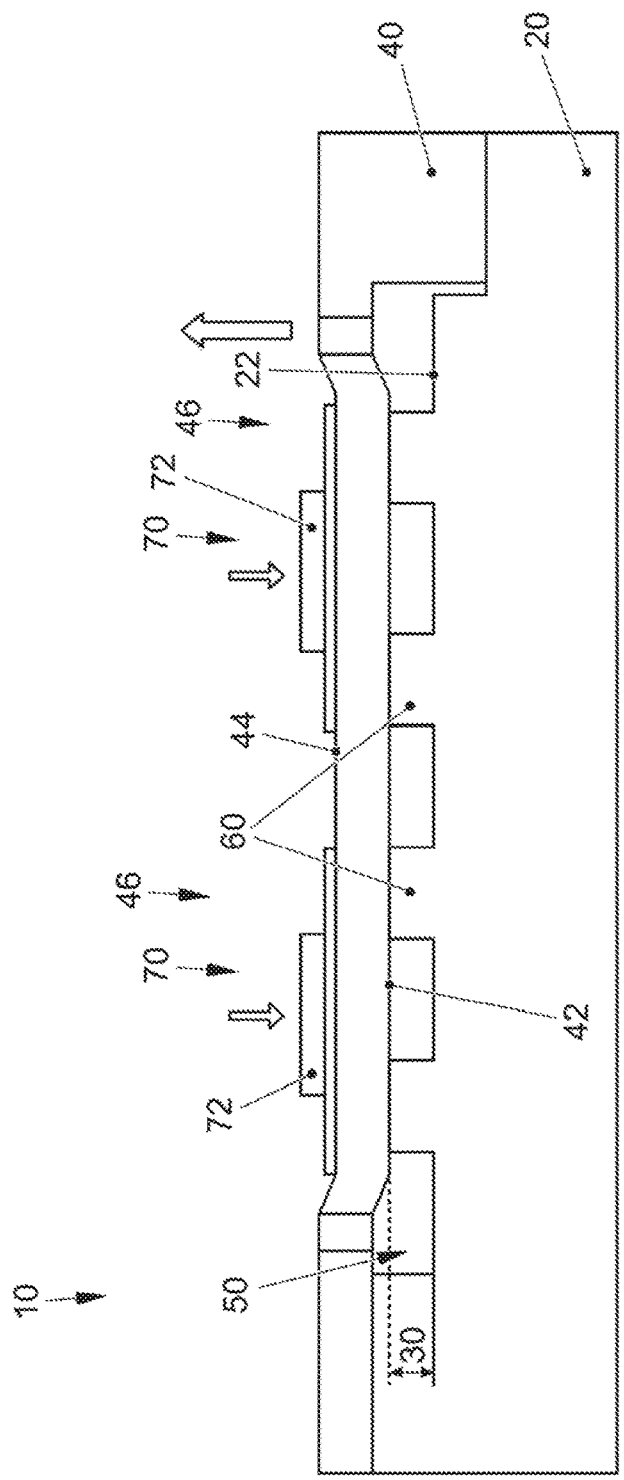
FIG. 4 shows the embodiment of FIGS. 1 to 3 after activation of the clamping device.

In order to eliminate the disadvantage according to FIG. 2, a method according to aspects of the invention is then continued further, and the clamping devices 70, in the case of FIG. 3 two clamping devices 70, are placed on the circumferential wall 44 of the outer housing 40. Subsequently, with the aid of the clamping means 72, a deformation force is applied radially, i.e. Inwardly, in the direction of the arrow according to FIG. 3 to the outer housing 40. In order to set an equilibrium of forces, a deformation of the outer housing 40, the end result of which is shown in FIG. 4, will accordingly arise. The deformation has taken place here, and therefore the cooling gap 30 within the cooling volume 50 has now been significantly reduced in the clamping axial portions 46. The cooling fluid can now no longer flow over the radial end sides of the channel walls 60 since an internal sealing of the cooling volume 40 against the radial end sides of the channel walls 60 has therefore taken place.

Figure 6:
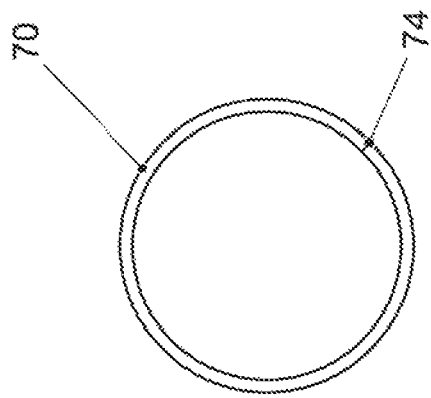
FIG. 6 shows the embodiment of FIG. 5 with the clamping device closed.
Figure 5:
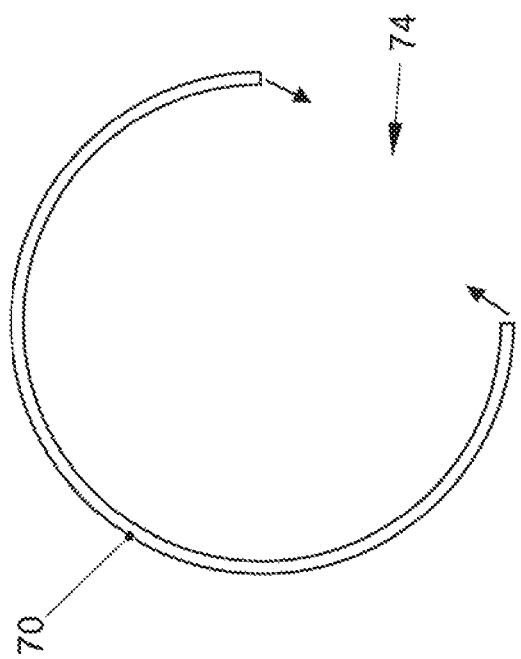
FIG. 5 shows an embodiment of a clamping device.

In order to bring the clamping devices 70 into the position as they are shown in FIGS. 3 and 4, use can be made, inter alia, of pushing on them axially. However, for improved flexibility in a method according to aspects of the invention, lateral engagement is also possible, as FIGS. 5 and 6 show. While the clamping device 70 is illustrated in the closed state in FIG. 6, the clamping device 70 is opened in an opening portion 74 in FIG. 5. An engaging movement of the clamping device 70 can now be carried out here in the radial direction in order to place the clamping device 70 as it were from the side around the outer housing 40 and subsequently to bring it again into the closed position according to FIG. 6. This leads to a significant increase in the flexibility in the use of a manufacturing method for a cooling device according to aspects of the invention.

The above explanation of the embodiments describes the present invention exclusively within the scope of examples. Of course, individual features of the description of the Figs., to the extent to which it is technically meaningful, can be combined freely with one another without departing from the scope of the present invention.

What is claimed is:

1. A cooling device for a vehicle, said cooling device comprising:
   an inner housing having an inner cooling wall,
   an outer housing having an outer cooling wall which surrounds the inner housing, and is spaced apart from the inner housing via a cooling gap,
   a cooling volume for passage of a cooling fluid that is formed between the inner cooling wall and the outer cooling wall,
   channel walls on either the inner cooling wall or the outer cooling wall, which divide the cooling volume and guide the cooling fluid along the cooling volume, and
   at least one clamping device arranged around the circumference of a circumferential wall of the outer housing for introducing a deformation force onto the outer housing in order to reduce the cooling gap by deforming the outer housing.

2. The cooling device as claimed in claim 1, wherein the clamping device has at least one clamping means for reversibly producing the deformation force.

3. The cooling device as claimed in claim 1, wherein the clamping device is designed for introducing the deformation force onto the outer housing in a radial direction or in a circumferential direction of the outer housing.

4. The cooling device as claimed in claim 1, wherein the clamping device extends over a clamping axial portion in the outer housing that takes up between 20% and 90% of an axial extent of the circumferential wall.

5. The cooling device as claimed in claim 1, wherein at least two clamping devices extend over a clamping axial portion of the outer housing that takes up between 20% and 90% of an axial extent of the circumferential wall.

6. The cooling device as claimed in claim 5, wherein the clamping devices are identical.

7. The cooling device as claimed in claim 1, wherein the clamping device has at least one of the following materials:
   metal;
   fiber composite material; and
   fiber material.

8. The cooling device as claimed in claim 1, wherein the outer housing is designed, at least in an axial clamping portion of the outer housing, to exhibit elastic or to substantially elastic deformation under the action of the deformation force of the clamping device.

9. The cooling device as claimed in claim 1, wherein the clamping device has an opening portion which, in an open position of the clamping device, has an opening which is greater than or equal to a diameter of the circumferential wall of the outer housing.

10. A method for installing the cooling device with the features of claim 1, comprising the following steps:
    pushing the outer housing onto the inner housing, thereby forming the cooling volume,
    arranging the at least one clamping device around a circumferential wall of the outer housing, and
    introducing the deformation force onto the outer housing using the clamping device in order to deform the outer housing for either reducing or eliminating the cooling gap.

11. The method as claimed in claim 10, wherein, when the deformation force is introduced, at least one deformation parameter of the clamping device or of the outer housing is measured or checked.

* * * * *